: 2,791,578
Patented May 7, 1957

2,791,578
NOVEL PAPER SIZING AGENTS

Erhart K. Drechsel, Springdale, and Randall Hastings and Edward Strazdins, Stamford, Conn., assignors to American Cyanamid Company, New York, N. Y., a corporation of Maine No Drawing. Application June 3, 1953,
Serial No. 359,432

9 Claims. (Cl. 260—101)

The present invention relates to the manufacture of fortifying rosin sizes or soaps useful in the manufacture of sized paper and for other purposes. More particularly the present invention relates to the manufacture of fortifying rosin sizes wherein a reaction product is formed corresponding to that formed by the coreaction of rosin, maleic anhydride, and a lower alkanol, and a sizing solution is made therefrom by saponifying the reaction mixture with a hot aqueous alkali metal alkali solution at atmospheric pressure, that is, at temperatures below the normal boiling point of such solutions. The invention includes the step of forming a mixture of fortified sizes either by mixing molten rosin with the aforementioned reaction mixture and saponifying the mixture, or by any equivalent method.

Rosin may be reacted with up to one mol of maleic anhydride or with known equivalents (hereinafter included in the term maleic anhydride) to form a Diels-Alder reaction product or adduct, hereinafter termed "maleated rosin" which, when reacted or saponified with an aqueous alkali such as aqueous sodium hydroxide acts as an adjuvant or "fortifier" for ordinary rosin size. The presence of a minor proportion of maleated rosin size in ordinary rosin size permits formation of sized paper having superior resistance to water and other liquids as compared with the resistance imparted by an equal weight of the rosin size alone.

When up to 7% (0.21 mol) of maleic anhydride is used, based on the weight of the rosin, the maleated rosin has a low softening point and can be readily formed into a homogeneous sizing solution by cooking with hot aqueous caustic solution at atmospheric pressure at temperatures slightly below the boil.

Rosin may also be reacted with more than 7% of its weight of maleic anhydride, the products obtained by reacting rosin with 8%–10% of its weight of maleic anhydride, however, being increasingly difficult to saponify by the method described.

When, however, rosin is reacted with 10% of its weight of maleic anhydride, corresponding to 0.3 mol of maleic anhydride per mol of rosin, the reaction product cannot be homogeneously saponified at atmospheric pressure by any practical means. Such maleated rosins have softening points so high that when cooked with aqueous caustic as close to the boil as control of foaming will permit, they form large solid masses only the surfaces of which are saponified. Maleated rosins of this type can be saponified only by cooking with aqueous caustic solution in an autoclave at temperatures well in excess of 100° C., the solution being maintained under sufficient pressure to permit the necessary temperatures to be reached.

Typically, when fully maleated rosins are saponified, solution temperatures of 150° C.–200° C. are required necessitating autoclave pressures up to 90 lbs. per sq. inch.

Rosin size is manufactured industrially in very large quantities and the cost of autoclave equipment large enough to accommodate the quantities involved, together with the heat requirements thereof, constitutes a serious disadvantage in the manufacture of rosin size by this method.

Maleated rosins which have softening points below 80° C., as determined by the capillary tube method, are readily saponified at atmospheric pressure. The higher softening point maleated rosins are increasingly difficult to saponify, and 85° C. is taken as representative of the maximum softening point which a maleated rosin may have and yet be saponifiable at atmospheric pressure in present-day industrial equipment.

From the foregoing it will be seen that need for pressure saponification can be obviated by partially maleating the rosin, that is, by maleating the rosin with less than 7% of its weight of maleic anhydride. Rosin maleated to this and lesser extents can be saponified at atmospheric pressure quite readily. In such event, however, not more than about 0.21 mol or 21% of the rosin undergoes the reaction, the remainder (0.79 mol or 79%) of the rosin passing through the reaction substantially unchanged. Thus when proceeding according to this method there is a very significant waste in heat, labor, and utilization of equipment.

The discovery has now been made that maleated rosins partially esterified with a lower alkanol, the weight of the alkanol being at least 2% of the weight of the rosin, and containing more than 0.3 mol of combined maleic anhydride or the equivalent, may readily be prepared in a form having softening points below about 85° C. and that homogeneous and very effective fortifying solutions are readily prepared when such esterified maleated rosins are at least partially neutralized with a caustic saponifying solution at atmospheric pressure at temperatures higher and preferably about 15° C. higher than their softening points.

The further discovery has been made that fully maleated esterified rosins, that is, rosins containing even substantially their full theoretical equivalent of maleic anhydride, and esterified as hereinafter described, have similarly low softening points and may be saponified in similar manner at atmospheric pressure with similar results.

We have found that the fortifying agents thus prepared may be mixed with liquid rosin size and that the mixture so prepared is a fortified size having substantially the same sizing effectiveness as rosin size which has been fortified in the same manner with maleated rosin prepared by the direct reaction of rosin with maleic anhydride.

From the foregoing it will thus be seen that the principal feature of the present invention is the reaction of rosin with between about 0.3–0.4 and 1 mol of maleic anhydride or its equivalent, taking the molecular weight of rosin to be 302, and a small amount, at least 2% based on the weight of the rosin, of a lower alkanol to form a partially esterified maleated rosin having a softening point below about 85° C. and saponifying the partially esterified maleated rosin at atmospheric pressure with hot aqueous alkali metal alkali solution having a temperature at least 15° C. higher than the softening point of the maleated rosin to form a homogeneous liquid fortifying sizing solution.

In addition to permitting saponification at atmospheric pressure, the present invention possesses other important advantages.

In the first place the partially esterified maleated rosin itself may be prepared under atmospheric pressure, without need for high pressure reaction equipment.

Finally, the present invention permits rosin in liquid form, at a comparatively low temperature, to be mixed with the partially esterified maleated rosin, and further permits the mixture to be saponified in the manner described, thus yielding in one step a fortified sizing solution containing any desired proportion of the maleated rosin.

The benefits of the present invention continue to increase as the ratio of maleic anhydride rises from 0.3 mol to its theoretical maximum of one mol per mol of rosin. As a practical matter, it is difficult to cause the last traces of maleic anhydride to react with the rosin when the former is present at its theoretical maximum ratio. In practice it is therefore preferred to employ about 0.7 to 0.9 mol of a maleic anhydride per mol of rosin, this proportion of maleic anhydride permitting the benefits of the present invention to be substantially attained while minimizing the amount of unreacted maleic anhydride or the equivalent carried into the product.

The amount of alcohol which should be added in each instance depends principally on the particular alcohol selected, the temperature of the reaction and the softening point which is desired to impart to the adduct. The effect of the various alcohols in depressing the softening point does not appear to be related directly to their molecular weight, and hence the proportions are best expressed in terms of the weight of the alcohol based on the weight of the rosin. Good results have been obtained when as little as 2% of alcohol is present in esterified form based on the weight of the rosin, equivalent to 1.6% based on the weight of fully maleated rosin. Very satisfactory results have been obtained by using from this amount up to 6%–8%, based on the weight of the rosin, this amount generally giving an adduct which softens in the range of 70°–85° C.

The addition of this or a greater amount of alcohol does no harm, but causes a further depression in the softening point which is unnecessarily great for practical purposes. Any unreacted alcohol remaining can be recovered by distillation. Alternatively, the unreacted alcohol may be allowed to remain in the reaction mixture where it will beneficially decrease the viscosity of the sizing solution prepared.

The correct amount in each instance to produce an adduct having the desired softening point can best be determined by making a series of simple laboratory trials, maintaining all conditions constant except the amount of alcohol.

The reaction described above may be performed by a number of different procedures, all essentially equivalent and each thus constituting a different aspect of the invention.

According to one procedure, the reaction may be performed in two separate steps. In the first step, rosin is reacted with the maleic anhydride. In the second step, the product is heated with the alkanol to form the partially esterified reaction mixture described. The reaction is continued in the presence of the alkanol until a reaction product is obtained having a softening point below 85° C.

According to the second method, also a two-step method, rosin is esterified with the requisite amount of the alkanol, and the resulting partially esterified rosin is heated with the maleic anhydride until substantially all of the maleic anhydride has reacted.

In industrial practice, it will undoubtedly be preferred to prepare the reaction product by a one-step method. This may be done by mixing the rosin with the maleic anhydride and the alkanol and refluxing the mixture at 160° C. to 210° C. both until reaction of the maleic anhydride with the rosin is substantially complete and a partially esterified reaction mixture results having a softening point below 85° C.

Any unreacted alkanol may be removed by distillation, or the alcohol may be allowed to remain. In this reaction it is probable that a proportion of the alkanol reacts at once to form a monoalkyl maleate, and hence this material may be used to replace all or part of the maleic anhydride and alkanol.

Other methods of preparing the above-described partially esterified maleated rosins will occur to those skilled in the art.

The softening points referred to in the specification and the claims are those determined by the standard capillary tube method, wherein the maleated rosin is finely crushed, mixed with a trace of an oil-insoluble dye such as Helmerco green BCG, and the powder placed in a capillary tube and the tube is placed in a hot water bath. In making the determination the softening point is taken as occurring at the temperature where the white powder begins to melt and to form droplets of colored liquid.

Formation of the partially esterified reaction products of the present invention takes place satisfactorily at any temperature from about 160° C.–220° C. and normally requires about 7 hours at the lower temperature and about 1 to 2 hours at the higher temperature. When the upper temperature is materially exceeded, an effect takes place, the nature of which is not understood, but which results in the development of a size of inferior quality. Below about 160° C. the reaction proceeds very slowly, making these lower temperatures uneconomic.

The reaction itself is preferably performed in a reflux vessel at atmospheric pressures. It may, however, be performed in an autoclave under autogenous pressure, and this permits somewhat less alcohol to be used.

Saponification of the partially esterified maleated rosins described may be performed by any of the methods normally employed for saponifying ordinary rosin. For example, the reaction mixture may be flowed with hot caustic solution into a conventional cook tank, or the caustic solution may be stirred into the reaction product in the reaction vessel itself. Neither the amount nor strength of the alkali metal base solution plays any part in the present invention. Normally, however, the solution will contain about 20% caustic by weight and sufficient of the reaction mixture will be saponified to provide a sizing solution containing more than 50% solids.

The temperature of the saponification should be not less than the softening point of the rosins as determined by the capillary tube method, and in general, the higher the temperature the more rapid the saponification. Preferably the caustic solution will be at least 10° C. above the softening point of the rosin, this temperature providing a fluid melt, and most advantageously will be as hot as possible consistent with tolerable development of foam. This is usually a few degrees below the boil. For example, in the case of soda ash and sodium hydroxide solutions, the preferred temperatures are within the range 92° C.–96° C., saponification taking place within this range with maximum rapidity yet with development of little foam.

Still alternatively, cool caustic solution may be mixed with the adduct in the solidified state and heated. Saponification begins when the temperature of the mixture is substantially equal to the softening point of the adduct.

The amount of caustic may be varied from that sufficient to produce a partially neutralized size preferred by paper manufacturers when the size is to be added directly to the beater, usually 50%–80%, to that sufficient to provide a substantially completely neutralized size, preferred when the size is to be transported in dry form.

It is not essential to use maleic anhydride in the synthesis. In its place, any equivalent material may be employed, for example, any material which forms maleic anhydride when heated to reaction temperatures. Included among the latter are maleic acid, and the half esters thereof. Fumaric acid and its half esters yield corresponding products.

As alkanols may be employed any alkanol containing not more than 5 carbon atoms, that is, methanol, ethanol, propanol, isopropanol, butanol, the isobutanols, amyl alcohol, and the isoamyl alcohols. All these alcohols yield very similar results on a weight for weight basis, and it is therefore apparent that the choice of alkanol is not critical, any lower alkanol being suitable.

In practice we prefer to employ the intermediate alcohols particularly the propanols. Retention of these alcohols in the reaction mixture is readily controlled by ordinary reflux equipment yet they can be readily stripped off when present in excess. Moreover, these alcohols act as an excellent viscosity depressant for the final size when the excess is allowed to remain in the mixture.

As saponifying agents any alkali metal alkali may be used including sodium hydroxide, sodium bicarbonate and sodium carbonate. The corresponding potassium salts may also be used, and these give somewhat better results when the saponified product is to be used as a foaming agent in the manufacture of gypsum board.

The saponified fortifying adducts of the present invention find their principal use in the manufacture of sized paper by the beater addition process. A stock of papermaking cellulosic fibers is formed at a consistency of about 0.5% to about 4% and to this is added between about ¼% and 4%, based on the dry weight of the fibers, of the saponified reaction mixture, preferably diluted to about 5% solids concentration. Sufficient alum is then added to precipitate the size, typically 1 to 1.5 times the weight of the size, after which the fibers are sheeted and dried to form paper.

More advantageously, in place of the saponified fortifying adduct referred to there will be added a mixture composed of the saponified reaction mixture and rosin size, in which event the former acts as a fortifier for the latter. Best results from the point of view of sizing imparted are obtained when the weight of the rosin size is 3 to 4 times the weight of the fortifying size, but very good results are obtained when the fortifying size is from about 10% to 50% of the mixture. Thus the mixture may advantageously contain from 10% to 50% by weight of the fortifying adduct. The total weight of the mixture of sizing agents added should be between about ¼% and 4% of the dry weight of the fibers.

The invention has been completely disclosed above. The following examples illustrate specific embodiments of the invention and are not to be construed as limitations thereon. Parts are by weight unless otherwise stated.

*Example 1*

A mixture of 453 g. (1.5 mols) of N-grade rosin and 205 g. (1.5 mols) of 95% monomethyl maleate was charged into a laboratory flask fitted with stirrer, thermometer and take-off condenser, heated at 195°–200° C. for 2 hours and cooled. A sample was found to have a softening point of 77° C. by the capillary tube method. Calculations based on the weight of methanol evolved indicated that the product contained 20.8% of the methanol present in the maleate, equivalent to 0.313 mol of methanol in esterified form.

500 g. of the product was melted over an oil bath at 105°–110° C. This was added to 540 gm. of a hot 25% NaOH solution at 95° C. A homogeneous, well saponified fortifying sizing solution was obtained by slowly stirring the mixture for 2 hours at that temperature. Hot water was then added to adjust the solids content to 50%.

A comparative experiment was made by mixing 453 gm. of the same rosin with 147 gm. (1.5 mols) of maleic anhydride and reacting the two in the same apparatus for 2 hours at 195° C.–200° C. The maleated rosin thus formed had a capillary tube softening point of 93° C. and could not be saponified when heated with 25% NaOH in the same manner. As a result of its high softening point the product was a lumpy mass, the lumps being saponified only on the outside.

*Example 2*

The procedure of Example 1 was repeated using however 227 g. (1.5 mols) of 95% monoethyl maleate in place of the 1.5 mols of monomethyl maleate. The product had a softening point of less than 70° C. and contained 31.8% of the alcohol present in the maleate ester, equivalent to 0.48 mol of esterified ethanol. The product was equally satisfactorily saponified at the same temperature using soda ash solution.

*Example 3*

The procedure of Example 1 was repeated using 249.5 g. (1.5 mols) of monoisopropyl maleate in place of the 1.5 mols of monomethyl maleate. The product contained 8.9% of the alcohol of the isopropyl maleate, equivalent to 0.133 mol of isopropanol, and had a softening point of 85° C. It was satisfactorily saponified in 20% soda ash solution, the saponification, however, being slower than the lower softening adducts of Examples 1 and 2 due to its higher softening point.

*Example 4*

The procedure of Example 1 was repeated using 249.5 g. (1.5 mols) of 95% mono-n-propylmaleate in place of the 1.5 mols of monomethylmaleate. The product had a softening point of less than 70° C. and contained 37.2% of the esterified propanol, equivalent to 0.55 mol of propanol based on the rosin used. The product was equally readily saponified.

*Example 5*

Into a 100-gallon steam jacketed kettle equipped with agitator and with a water-cooled reflux and takeoff condenser was charged 198.5 lbs. (0.66 mol) of gum rosin, and steam was passed into the jacket. When the rosin was fluid, 51.5 lbs. (0.525 mol) of maleic anhydride was added and the condenser set for total reflux. With the charge at 130° C. 17.5 lbs. of isopropanol (0.445 mol) was then run in causing the temperature of the mixture to rise to 165° C. as adduct formation and esterification took place. The mixture was refluxed for 7 hours resulting in formation of a partially esterified maleated rosin having a softening point of 74° C.

Heating was then discontinued. 58 lbs. of sodium hydroxide as a 19.4% aqueous solution was then added, the solution being added very slowly at first to avoid overloading the condenser. After all the caustic had been added, the mixture was stirred at 92°–95° C. for 2 hours. A homogeneous fully saponified fortifying sizing solution was obtained which was free from lumps, which had a solids content of 53.5% and which had a pH of 9.

*Example 6*

The procedure of Example 5 was repeated except that the method of saponification was reversed. The caustic solution was prepared in a closed vessel provided with steam coils, condenser and stirrer and was heated to 94° C. The partially esterified maleated rosin was allowed to flow into the caustic solution slowly. After all the maleated rosin had been added, the sizing solution was cooked at 90°–95° C. for one hour. During the cooking a part of the esterified isopropanol was hydrolyzed. The sizing solution obtained was substantially identical with the solution of Example 5.

*Example 7*

14,800 pounds of sizing solution prepared according to Example 6, having a solids content of 59% and a temperature of 70° C. and 25,000 pounds of tall oil rosin at 140° C. were simultaneously added to a reaction tank equipped with heating coils and agitator. The mixture was maintained at 100° C. until homogeneous and a solution at 95° C. of 1650 pounds of caustic soda dissolved in 5,000 pounds of water added to saponify the tall oil rosin. The reaction mixture was held at 95°–100° C. for 1 hour. The product, a mixture of maleated rosin size and tall oil rosin size, was then cooled and 375 pounds of isopropanol added to reduce its viscosity.

*Example 8*

3,020 lbs. of gum rosin (10 mols) was charged into a steam-jacketed kettle equipped with agitator, a water-cooled reflux and take-off condenser, and melted. To this was added a solution of maleic anhydride in monoisopropyl maleate prepared by dissolving 347 lbs. of maleic anhydride (3.55 mols) in 693 lbs. of monoisopropyl maleate (5.3 mols). The mixture was heated to 160° C., agitation being assisted by circulation of the mixture. Isopropanol was liberated soon thereafter and was refluxed for 2 hours. The condenser was then set for isopropanol take-off, and 60 lbs. was collected. The reaction was continued for a total of 7 hours at 160° C. giving an adduct having a softening point of 75° C.

To the reaction product was added 890 lbs. of sodium hydroxide (22 mols) dissolved in 3190 lbs. of water, the addition being made slowly at first until evolution of steam had moderated. The solution was stirred for 1 hour under reflux to minimize loss of water at 90° C. The pH of the size thus prepared was about 9.2 and its solids content about 55%. It was substantially identical with the solution of Example 5.

*Example 9*

250 lbs. of gum rosin (0.82 mol), 65 lbs. (0.66 mol) of maleic anhydride and 14.3 lbs. (0.24 mol) of isopropanol were run into an autoclave and the mixture heated to about 165° C. and maintained at that temperature under autogenous pressure for 7 hours. The product which had a softening point of 81° C. was slowly run into a solution of 80.4 lbs. (2 mols) of sodium hydroxide in 215.5 lbs. of water at 95° C. with agitation, and stirred at that temperature for one hour. The caustic solution was in a vessel provided with a steam condenser and the condensed steam was returned to the solution. The solids concentration of the size thus prepared was 62.1%. It was substantially identical with the solution of Example 5.

We claim:

1. A process for manufacturing a rosin size fortifying agent which includes the steps of coreacting at about 160°–220° C. one mol of rosin, 0.3 mol to 1 mol of maleic anhydride, and at least 2% of a lower alkanol based on the weight of the rosin to form a partially esterified maleated rosin having a softening point below 85° C. and saponifying said maleated rosin at atmospheric pressure with hot aqueous alkali metal alkali solution having a temperature higher than the softening point of said maleated rosin.

2. A process for manufacturing a rosin size fortifying agent which includes the steps of coreacting at about 160°–220° C. one mol of rosin with 0.3 mol to 1 mol of a mixture of maleic anhydride and a lower alkyl monoester of maleic acid, the alkanol thus esterified being at least 2% of the weight of the rosin, to form a partially esterified maleated rosin having a softening point below 85° C., and saponifying said maleated rosin at atmospheric pressure with hot aqueous alkali metal alkali solution having a temperature at least about 15° C. above the softening point of said maleated rosin.

3. A process for manufacturing a rosin size fortifying agent which includes the steps of esterifying a lower alkanol with a material corresponding to the condensation product of rosin with 0.3 mol to 1 mol of maleic anhydride to form a partially esterified maleated rosin having a softening point below 85° C., and saponifying said rosin at atmospheric pressure with hot aqueous alkali metal alkali solution having a temperature at least about 15° C. above the softening point of said partially esterified maleated rosin.

4. A process according to claim 1 wherein the coreactants are refluxed at atmospheric pressure.

5. A process according to claim 1 wherein the alkanol is a propanol.

6. A process according to claim 1 wherein the aqueous alkali metal alkali is aqueous sodium hydroxide.

7. A process according to claim 1 wherein the amount of maleic anhydride is between 0.7 and 0.9 mol per mol of rosin.

8. A process according to claim 2 wherein the amount of mixture of maleic anhydride and a lower alkyl monoester of maleic acid is between 0.7 and 0.9 mol per mol of rosin.

9. A process according to claim 3 wherein the amount of maleic anhydride is between 0.7 and 0.9 per mol of rosin.

References Cited in the file of this patent

UNITED STATES PATENTS

| | | |
|---|---|---|
| 2,081,889 | Borglin | May 25, 1937 |
| 2,447,750 | Harris | Aug. 24, 1948 |
| 2,465,888 | Lawrence | Mar. 29, 1949 |
| 2,628,918 | Wilson et al. | Feb. 17, 1953 |